US010921003B2

United States Patent
Chen et al.

(10) Patent No.: US 10,921,003 B2
(45) Date of Patent: Feb. 16, 2021

(54) SELF-POWER AIR REFRESHER SYSTEM

(71) Applicant: National Tsing Hua University, Hsinchu (TW)

(72) Inventors: Han-Yi Chen, Hsinchu (TW); Tzu-Yin Liu, Hsinchu (TW); Yu-Hsuan Hung, Hsinchu (TW); Chung-Sheng Ni, Hsinchu (TW); Peng-Hsuan Chiang, Hsinchu (TW); Fang-Yi Lin, Hsinchu (TW); Shih-Fu Liu, Hsinchu (TW)

(73) Assignee: National Tsing Hua University, Hsinchu (TW)

( * ) Notice: Subject to any disclaimer, the term of this patent is extended or adjusted under 35 U.S.C. 154(b) by 242 days.

(21) Appl. No.: 16/233,128

(22) Filed: Dec. 27, 2018

(65) Prior Publication Data

US 2020/0124300 A1 Apr. 23, 2020

(30) Foreign Application Priority Data

Oct. 19, 2018 (TW) .................................. 107137021

(51) Int. Cl.
*B01D 53/85* (2006.01)
*F24F 13/20* (2006.01)
(Continued)

(52) U.S. Cl.
CPC ............ *F24F 3/1603* (2013.01); *B01D 53/85* (2013.01); *H01M 8/16* (2013.01); *B01D 2259/4558* (2013.01); *F24F 2003/1653* (2013.01)

(58) Field of Classification Search
CPC ............ B01D 53/85; B01D 2259/4558; B01D 2259/812; B01D 2258/06; F24F 3/1603;
(Continued)

(56) References Cited

U.S. PATENT DOCUMENTS

| 5,853,460 A | 12/1998 | Alcordo |
| 8,637,171 B2* | 1/2014 | Hamelers ............... H01M 8/16 429/2 |

(Continued)

FOREIGN PATENT DOCUMENTS

| CN | 101908633 | 12/2010 |
| CN | 103148549 | 6/2013 |

(Continued)

OTHER PUBLICATIONS

"Office Action of Taiwan Counterpart Application", dated Apr. 19, 2019, pp. 1-3.

(Continued)

*Primary Examiner* — Minh Chau T Pham
(74) *Attorney, Agent, or Firm* — JCIPRNET

(57) ABSTRACT

A self-power air refresher system includes an air refresher apparatus and a plant microbial fuel cell (PMFC). The air refresher apparatus includes a fan, a filter located on an air-outlet path of the fan, and an energy storage device connected to the fan. The PMFC is disposed on the air-outlet path and includes soil contained in a container, a plant planted in the soil, and a first and second electrodes. The interaction between roots of the plant and microorganisms near the roots generates electrons, and the electrons are transmitted to the energy storage device through the first and second electrodes installed in the soil so as to enable the energy storage device to supply power to the fan. The air that has passed through the filter enters the soil of the PMFC, and is filtered by the plant and then discharged from the container.

10 Claims, 3 Drawing Sheets

(51) Int. Cl.
  *H01M 8/16* (2006.01)
  *F24F 3/16* (2021.01)
(58) Field of Classification Search
  CPC .......... F24F 13/20; F24F 5/0046; H01M 8/16;
  Y02E 60/50
  USPC ............................. 55/385.1; 136/256; 429/2
  See application file for complete search history.

(56) References Cited

U.S. PATENT DOCUMENTS

2010/0224246 A1* 9/2010 Tender ................ H01M 14/005
  136/256
2016/0351936 A1* 12/2016 Cooke .................... H01M 8/16
2018/0138538 A1* 5/2018 Ramasamy ............ C07K 19/00
2018/0269511 A1* 9/2018 Togo ................... H01M 8/2475
2019/0265080 A1* 8/2019 Awatsu ................. G01R 31/40

FOREIGN PATENT DOCUMENTS

| CN | 107079743 | 8/2017 |
| JP | 111290437 | 10/1999 |
| JP | 2003181285 | 7/2003 |

OTHER PUBLICATIONS

Lu Lu et al., "Microbial community structure accompanied with electricity production in a constructed wetland plant microbial fuel cell," Bioresource Technology, vol. 195, Nov. 2015, pp. 115-121.

* cited by examiner

SELF-POWER AIR REFRESHER SYSTEM

CROSS-REFERENCE TO RELATED APPLICATION

This application claims the priority benefit of Taiwan application serial no. 107137021, filed on Oct. 19, 2018. The entirety of the above-mentioned patent application is hereby incorporated by reference herein and made a part of this specification.

BACKGROUND

Technical Field

The disclosure relates to an air refresher apparatus, particularly to a self-power air refresher system.

Description of Related Art

According to a report issued by the World Health Organization on May 2, 2018, the number of deaths caused by outdoor air pollution is 7 million per year. The so-called air pollutants mainly include gases, suspended solid particles and suspended droplets. Among the main air pollutants produced by humans, the gases include sulfur oxides ($SO_x$), nitrogen oxides ($NO_x$) and volatile organic matter, etc., and suspended particulate matter includes silicon, aluminum, iron, nickel, carbon, lead, hydrocarbons, nitrates, sulfates or the like. The suspended particulate matter may further be categorized according to particle size. For example, PM10 refers to particles with a particle size of 10 micrometers or less. This kind of particle can break through a protection mechanism of the human respiratory tract and directly arrive at the lungs to interfere with gas exchange in the lungs, thereby causing diseases such as silicosis, lung cancer and so on. PM2.5 can even pass through alveoli into blood, which is extremely harmful to human health.

There have been commercially available air purifier products for alleviating or reducing the increasingly serious air pollution problem. However, these products generally require an external power supply to perform an air extraction and filtration process, and are therefore unlikely to be applied in outdoor areas. That is, current products cannot effectively alleviate or reduce the air pollution problem in outdoor environments.

SUMMARY

The disclosure provides a self-power air refresher system, by which the need for an external power supply can be eliminated, the cost can be reduced, and the convenience and extensiveness of air cleaners can be greatly improved.

The self-power air refresher system of the disclosure includes an air refresher apparatus and a plant microbial fuel cell (PMFC). The air refresher apparatus includes a fan, a filter located on an air-outlet path of the fan, and an energy storage device connected to the fan. The filter allows air introduced via the fan to pass therethrough. The PMFC is disposed on the air-outlet path and includes soil, a plant, a first electrode and a second electrode. The soil is contained in a container and has microorganisms therein. The plant is planted in the soil in the container and generates electrons by interaction between roots of the plant and the microorganisms near the roots. The first electrode is disposed in the soil at the bottom of the container and electrically connected to the energy storage device; the second electrode is disposed in the soil relative to the first electrode or on a surface of the soil and is electrically connected to the energy storage device. The first electrode and the second electrode collect the electrons to generate power and transmit the power to the energy storage device so as to enable the energy storage device to supply the power to the fan. The air that has passed through the filter enters the soil of the PMFC, and is filtered by the plant and then discharged from the container.

In an embodiment of the disclosure, the first electrode and the second electrode are carbon materials.

In an embodiment of the disclosure, the carbon materials include activated carbon or carbon granules.

In an embodiment of the disclosure, the filter includes an activated carbon layer.

In an embodiment of the disclosure, the container has a plurality of holes in a portion in the vicinity of the filter for entry of the air into the soil.

In an embodiment of the disclosure, the container has a plurality of holes on a wall surface for discharge of the air that has been filtered by the plant.

In an embodiment of the disclosure, the fan is located between the filter and the energy storage device.

In another embodiment of the disclosure, the filter is located near the bottom of the container, the fan is directly installed in a lower half of the container, and the energy storage device is disposed on a lateral side of the container opposite to the fan below the filter.

In an embodiment of the disclosure, the first electrode and the energy storage device are connected to each other via a metal wire, and the second electrode and the energy storage device are connected to each other via another metal wire.

In an embodiment of the disclosure, the energy storage device includes a battery or a capacitor.

Based on the above, in the disclosure, by using an air refresher apparatus including a fan and an energy storage device and a PMFC as both a power generation device and a filtration device, the need for an external power supply can be eliminated, the cost of device use and maintenance can be reduced and the convenience and extensiveness of air cleaners can be greatly improved. For example, the self-power air refresher system of the disclosure can be widely applied in outdoor areas such as exterior walls of buildings, streets, trees on traffic islands and so on.

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DESCRIPTION OF THE EMBODIMENTS

Figure 1:
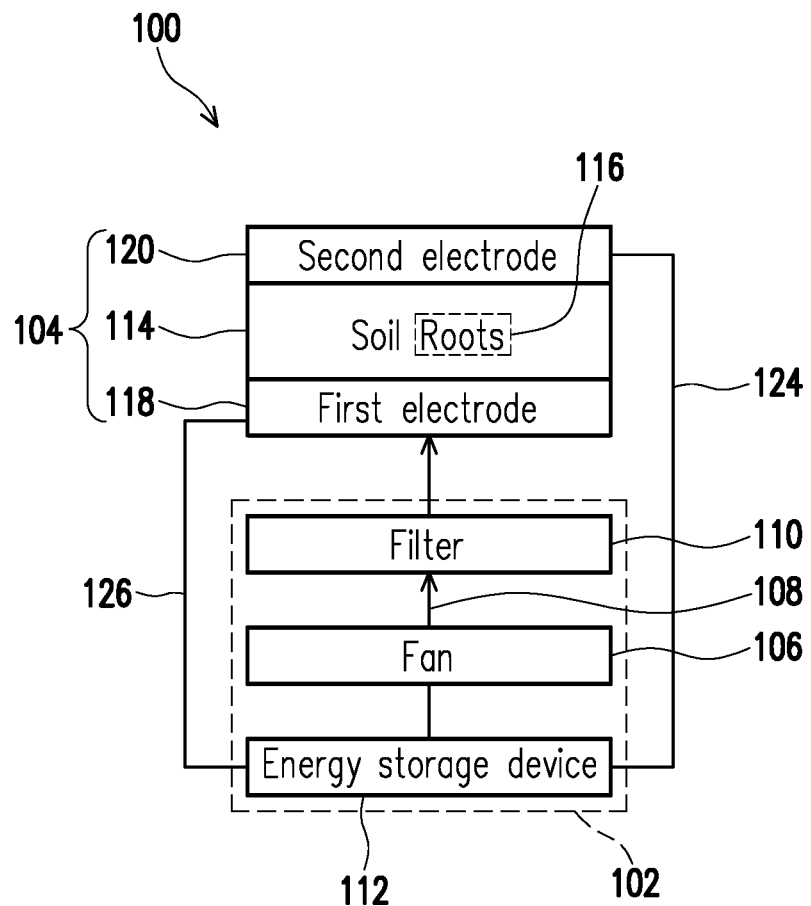
FIG. 1 is a block diagram of a self-power air refresher system according to an embodiment of the disclosure.

Exemplary embodiments of the disclosure will be described comprehensively below with reference to the drawings, but the disclosure may be embodied in many different forms and should not be construed as being limited to the embodiments described herein. For clarity, in the drawings, the sizes and thicknesses of the areas, portions and layers are not illustrated in accordance with actual ratios. In addition, similar or identical elements or features tend to be denoted by similar or identical reference numerals in the drawings. Similar reference numerals in the drawings denote similar elements and descriptions thereof are not repeated.

In addition, terms such as "comprise," "include," "have" and the like used herein are all open terms, which mean including but not limited to. Moreover, directional terms mentioned herein, such as "on," "below," "upper" and "lower," are only directions relative to the drawings. Therefore, the directional terms are used to illustrate rather than to limit the disclosure.

FIG. 1 is a block diagram of a self-power air refresher system according to an embodiment of the disclosure.

Referring to FIG. 1, a self-power air refresher system 100 includes an air refresher apparatus 102 and a PMFC 104. The air refresher apparatus 102 of the present embodiment at least includes a fan 106, a filter 110 located on an air-outlet path 108 of the fan 106, and an energy storage device 112 connected to the fan 106. The filter 110 allows air introduced via the fan 106 to pass therethrough so as to filter suspended particulate matter in the air. In an embodiment, the filter 110 is, for example, a porous material layer such as an activated carbon layer whose pores range from macropores to micropores. Since an activated carbon material is easy to use, nontoxic and highly chemically stable, an activated carbon layer is preferably used as the filter 110 in the present embodiment. Moreover, by appropriately designing the pore size, the suspended particulate matter in the air can be effectively filtered. In addition, the energy storage device 112 in the air refresher apparatus 102 is, for example, a battery or a capacitor, wherein examples of the battery include but are not limited to, a lithium ion battery, a sodium ion battery, a potassium ion battery, a magnesium ion battery, an aluminum ion battery, a nickel hydrogen battery, a lead acid battery, an alkaline battery, a manganese battery, a carbon zinc battery, a metal air battery and so on; the capacitor may be a general capacitor or a supercapacitor.

The PMFC 104 of the present embodiment at least includes soil 114, roots 116 of a plant, a first electrode 118 and a second electrode 120. In FIG. 1, arrows are used to indicate the air-outlet path; that is, the PMFC 104 is disposed on one side of the filter 110 so that the air that has been first filtered by the filter 110 enters the soil 114 and is filtered again by the roots 116 of the plant and then discharged. The soil 114 is generally contained in a container (not shown), and the soil 114 has microorganisms (not shown) therein. Thus, the roots 116 of the plant located in the soil 114 and the nearby microorganisms interact to generate electrons. In detail, nutrients produced by photosynthesis performed by the plant itself are released into the soil 114 through the roots 116 of the plant, and the microorganisms around the roots 116 of the plant generate the electrons in a reaction for decomposing sugar-containing nutrients. The first electrode 118 and the second electrode 120 are disposed in the soil 114 and are each electrically connected to the energy storage device 112. The first electrode 118 and the second electrode 120 are configured to collect the above electrons to generate power and transmit the power to the energy storage device 112 for storage, such that the energy storage device 112 can supply the power to the fan 106. The second electrode 120 may be disposed in the soil 114 relative to the first electrode 118 or on a surface of the soil 114.

In an embodiment, the first electrode 118 and the second electrode 120 may be carbon materials, for example, activated carbon or carbon granules. Since an activated carbon material has high specific surface area, in the present embodiment, activated carbon is preferably used as the first electrode 118 and the second electrode 120, so as to increase contact area between an electrode material and the microorganisms, thereby improving power generation efficiency of the PMFC 104. In addition, in an embodiment, the first electrode 118 and the energy storage device 112 are connected to each other via a metal wire 126, and the second electrode 120 and the energy storage device 112 are connected to each other via another metal wire 124, wherein the metal wires 124 and 126 are, for example, copper wires, aluminum wires, silver wires, gold wires, titanium wires or the like.

Figure 2:
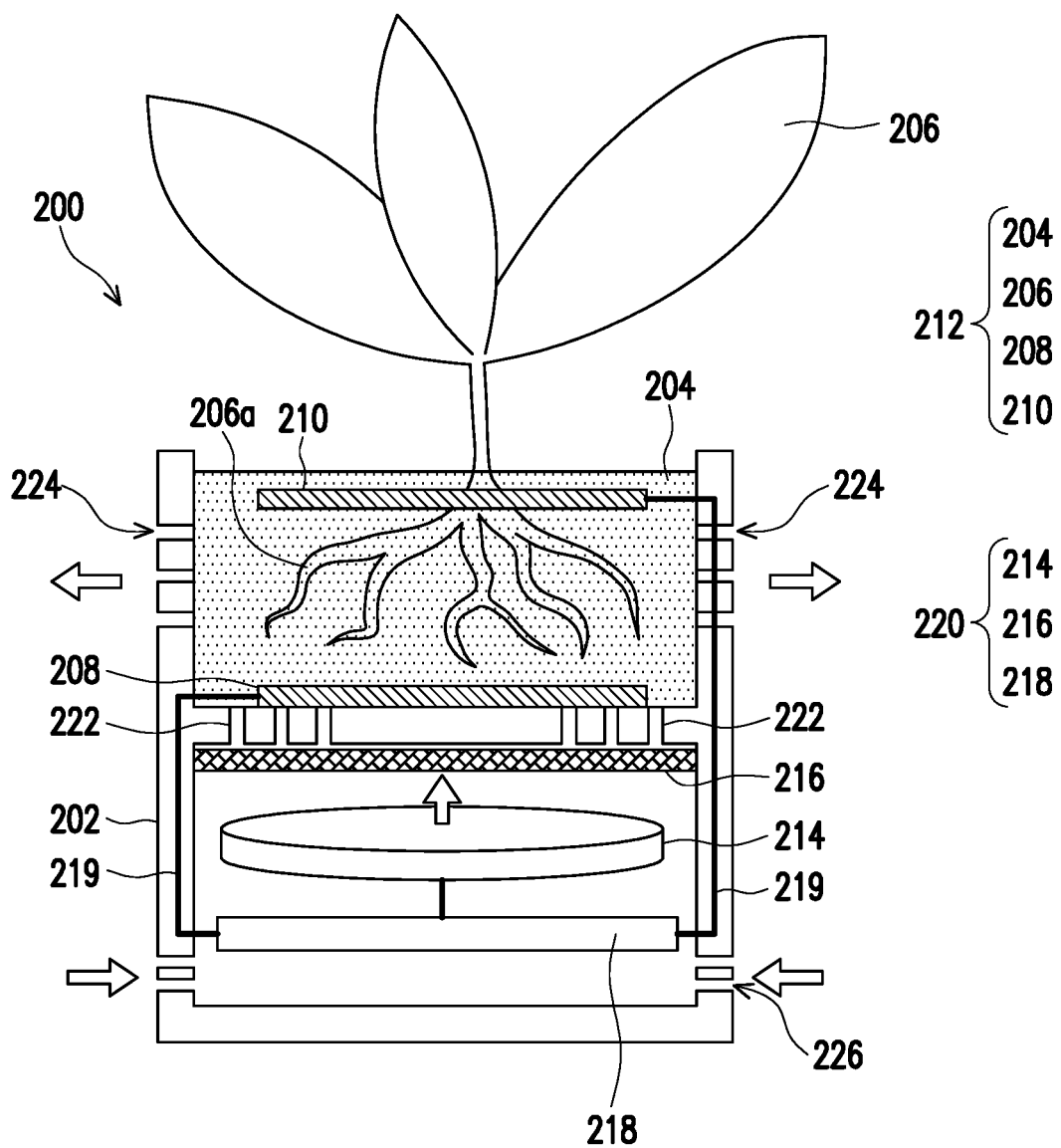
FIG. 2 is a schematic diagram of a self-power air refresher system according to another embodiment of the disclosure.

FIG. 2 is a schematic diagram of a self-power air refresher system according to another embodiment of the disclosure.

Referring to FIG. 2, the present embodiment is a specific example of the previous embodiment, in which a self-power air refresher system 200 may be designed as a potted plant, and all apparatuses are disposed in a container 202. Soil 204 is contained in an upper half of the container 202, and the soil 204 has microorganisms (not shown) therein. A plant 206 is planted in the soil 204 in the container 202 and generates electrons by interaction between roots 206a of the plant 206 and the microorganisms near the roots 206a of the plant 206. A first electrode 208 is disposed in the soil 204 at the bottom of the upper half of the container 202; a second electrode 210 is disposed in the soil 204 relative to the first electrode 208 or on a surface of the soil 204. The first electrode 208 and the second electrode 210 collect the above electrons to generate power. Thus, the soil 204, the plant 206, the first electrode 208 and the second electrode 210 constitute a PMFC 212.

A small fan 214 is installed in a lower half of the container 202, but the disclosure is not limited thereto; the number and size of the fan 214 can be changed according to design needs. A filter 216 is disposed on an air-outlet path of the fan 214 to allow air introduced via the fan 214 to pass therethrough. In FIG. 2, the air-outlet path is indicated by blank arrows; that is, the filter 216 is located between the fan 214 and the PMFC 212. In addition, an energy storage device 218 connected to the fan 214 is installed in the container 202 to supply power to the fan 214. The power stored in the energy storage device 218 comes from the electrons collected by the first electrode 208 and the second electrode 210 of the PMFC 212. Thus, the fan 214, the filter 216 and the energy storage device 218 constitute an air refresher apparatus 220. In an embodiment, the electrical connection between the first electrode 208 and the energy storage device 218 and the electrical connection between the second electrode 210 and the energy storage device 218 are both via a metal wire 219.

In addition, to enable smooth air flow, the container 202 has several holes 222 in a portion in the vicinity of the filter 216 for entry of the air into the soil 204. There are also several holes 224 on a wall surface of the container 202 for discharge of the air that has been filtered by the plant 206. Furthermore, if there is no opening in the space in which the air refresher apparatus 220 is placed, it is also necessary to provide several holes 226 in a corresponding portion (e.g., the bottom) of the container 202, so as to allow the air to enter from the holes 226 and then be blown to the filter 216 by the fan 214 in a direction as indicated by the blank arrows in FIG. 2. After entering the soil 204 through the holes 222, volatile organic matter in the air can be filtered by the plant 206, and the air is then discharged from the container 202 via the holes 224.

In FIG. 2, the first electrode 208 and the second electrode 210 do not actually cover the entire area within the container 202, but leave space for the air to enter and exit and for the roots 206a of the plant 206 to grow freely. Therefore, air flow is not hindered. In addition, the shape of the container 202 and the positions, sizes, and numbers of the holes 222, 224, and 226 can be changed according to actual needs, and are not limited to those shown in FIG. 2. The materials or types of the first electrode 208, the second electrode 210, the filter 216 and the energy storage device 218 have been described in the previous embodiment and therefore descriptions thereof will not be repeated.

Figure 3:
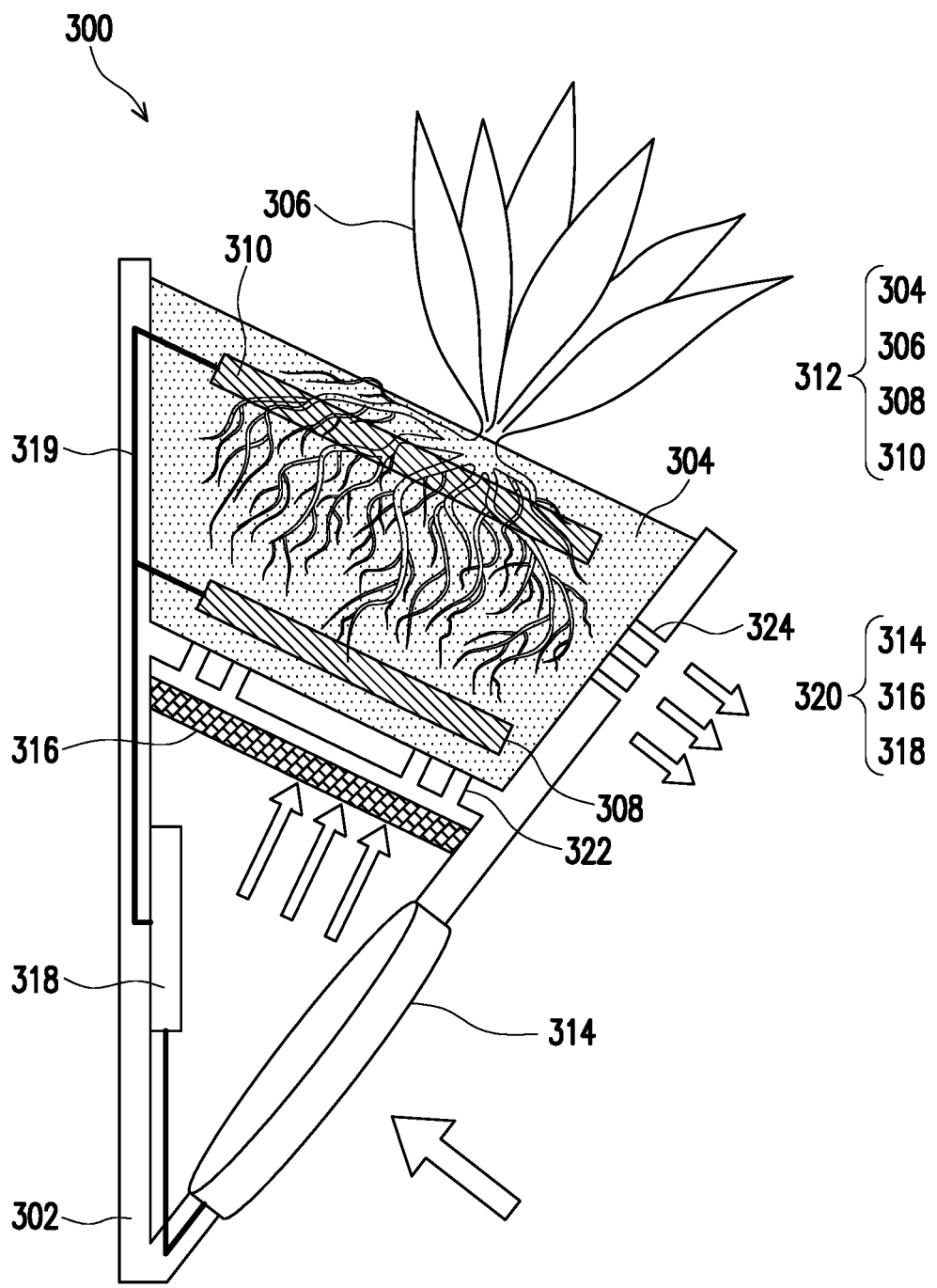
FIG. 3 is a schematic diagram of a self-power air refresher system according to still another embodiment of the disclosure.

FIG. 3 is a schematic diagram of a self-power air refresher system according to still another embodiment of the disclosure.

Referring to FIG. 3, the present embodiment is another specific example of the embodiment of FIG. 1, in which a self-power air refresher system 300 may be designed as a wall-mounted potted plant and be widely applied in outdoor areas such as exterior walls of buildings, streets, trees on traffic islands and so on. The self-power air refresher system 300 is not only used to beautify the exterior walls of buildings, but also has functions of air cleaning for an outdoor environment and temperature lowering. All of the apparatuses of the self-power air refresher system 300 may be disposed in a container 302, and the container 302 may be designed to adhere to a wall surface and have a tapered shape with a wider top and a narrow bottom. Soil 304 is contained in an upper half of the container 302, a plant 306 is planted in the soil 304, and electrons are generated by interaction between the plant 306 and microorganisms near roots of the plant 306. A first electrode 308 is disposed in the soil 304 at the bottom of the upper half of the container 302; a second electrode 310 is disposed in the soil 304 relative to the first electrode 308 or on a surface of the soil 304. The soil 304, the plant 306, the first electrode 308 and the second electrode 310 constitute a simple PMFC 312.

A filter 316 can be installed near the bottom of the upper half of the container 302, and a fan 314 can be directly installed in a lower half of the container 302 to draw in the air directly from the outside. An energy storage device 318 is disposed on the lateral side of the container 302 opposite to the fans 314 (below the filter 316), so as to form an air refresher apparatus 320. In FIG. 3, the air-outlet path is indicated by blank arrows; that is, the air drawn in by the fan 314, after entering the lower half of the container 302, passes through where the energy storage device 318 is located and then turns to the filter 316. The first electrode 308 and the second electrode 310 of the PMFC 312 collect electrons generated by interaction between the plant 306 and the microorganisms near the roots of the plant 306, and transmit the electrons to the energy storage device 318 for storage via a metal wire 319. Then, the energy storage device 318 supplies the stored power to the fan 314 without the need for an external power supply, and thus the cost of device use and maintenance can be reduced.

In addition, to enable smooth air flow, the container 302 has several holes 322 in a portion in the vicinity of the filter 316 for entry of the air into the soil 304. There are also several holes 324 on a wall surface of the container 302 for discharge of the air that has been filtered by the plant 306. In FIG. 3, the first electrode 308 and the second electrode 310 do not actually cover the entire area within the container 302, but leave space for the air to enter and discharge. Therefore, air flow is not hindered. In addition, the shape of the container 302 and the positions, sizes, and numbers of the holes 322 and 324 can be changed according to actual needs, and are not limited to those shown in FIG. 3. The materials or types of the first electrode 308, the second electrode 310, the filter 316 and the energy storage device 318 have been described in the previous embodiment and therefore descriptions thereof will not be repeated.

In summary, the disclosure combines technologies of air purification and biopower generation to form a special self-power air refresher system, by which not only can an external power supply be omitted, but air cleaners can be widely applied in outdoor areas. Therefore, the convenience and extensiveness of air cleaners is greatly improved. Meanwhile, the design of self-power sustainable energy applications can also greatly reduce the cost of device use and maintenance.

It will be apparent to those skilled in the art that various modifications and variations can be made to the structure of the disclosed embodiments without departing from the scope or spirit of the disclosure. In view of the foregoing, it is intended that the disclosure cover modifications and variations of this disclosure provided they fall within the scope of the following claims and their equivalents.

What is claimed is:

1. A self-power air refresher system comprising:
    an air refresher apparatus comprising:
        a fan;
        a filter located on an air-outlet path of the fan to allow air introduced via the fan to pass therethrough; and
        an energy storage device connected to the fan; and
    a plant microbial fuel cell (PMFC) disposed on the air-outlet path, comprising:
        soil contained in a container, the soil having microorganisms therein;
        a plant planted in the soil in the container and generating electrons by interaction between roots of the plant and the microorganisms near the roots;
        a first electrode disposed in the soil at a bottom of the container and electrically connected to the energy storage device; and
        a second electrode disposed in the soil relative to the first electrode or on a surface of the soil and electrically connected to the energy storage device, wherein
    the first electrode and the second electrode collect the electrons to generate power and transmit the power to the energy storage device so as to enable the energy storage device to supply the power to the fan, and
    the air that has passed through the filter enters the soil of the PMFC, and is filtered by the plant then discharged from the container.

2. The self-power air refresher system according to claim 1, wherein the first electrode and the second electrode are carbon materials.

3. The self-power air refresher system according to claim 2, wherein the carbon materials comprise activated carbon or carbon granules.

4. The self-power air refresher system according to claim 1, wherein the filter comprises an activated carbon layer.

5. The self-power air refresher system according to claim 1, wherein the container has a plurality of holes in a portion in the vicinity of the filter for entry of the air into the soil.

6. The self-power air refresher system according to claim 1, wherein the container has a plurality of holes on a wall surface for discharge of the air that has been filtered by the plant.

7. The self-power air refresher system according to claim 1, wherein the fan is located between the filter and the energy storage device.

8. The self-power air refresher system according to claim 1, wherein the filter is near the bottom of the container, the fan is directly installed in a lower half of the container, and the energy storage device is disposed on a lateral side of the container opposite to the fan below the filter.

9. The self-power air refresher system according to claim 1, wherein the first electrode and the energy storage device are connected to each other via a metal wire, and the second electrode and the energy storage device are connected to each other via another metal wire.

10. The self-power air refresher system according to claim 1, wherein the energy storage device comprises a battery or a capacitor.

* * * * *